April 25, 1961  J. E. PETERSEN ET AL  2,981,424
LOADING APPARATUS
Filed Feb. 19, 1960  3 Sheets-Sheet 1
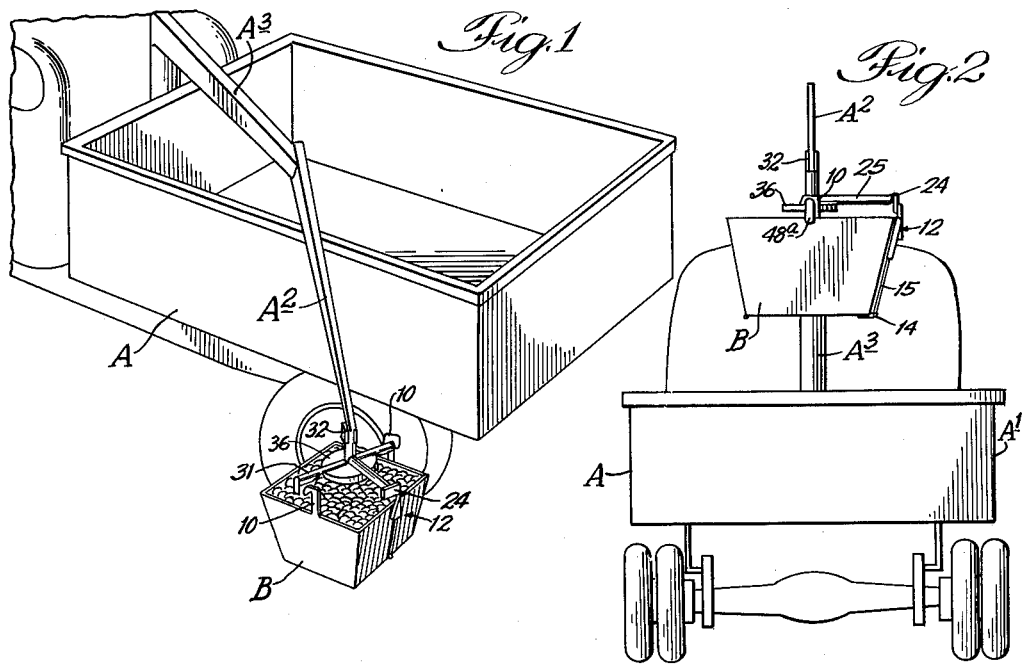
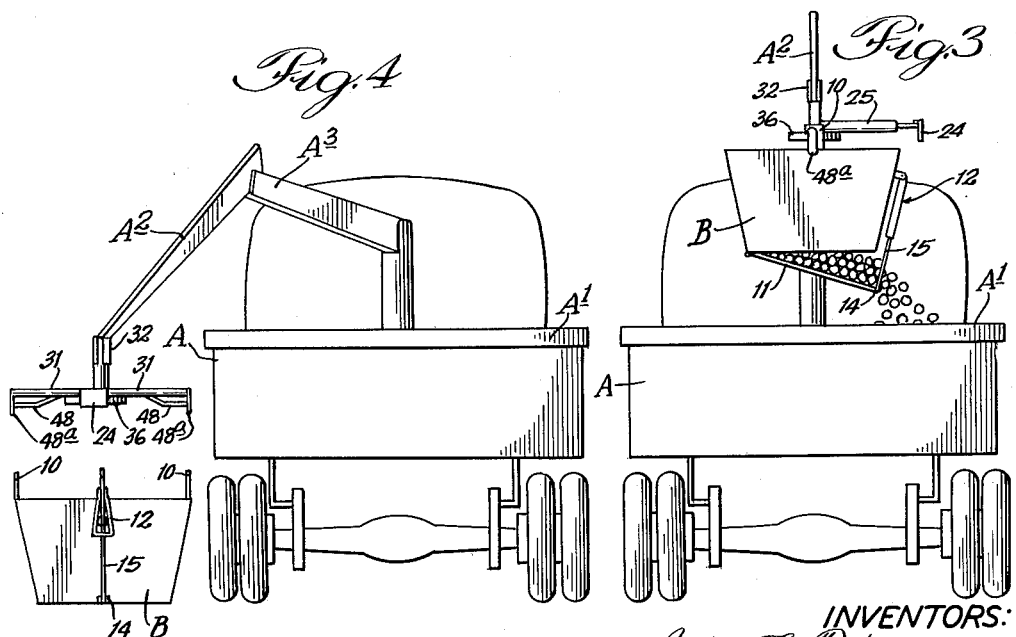
INVENTORS:
John E. Petersen
and Orrin C. Lawson
BY Dawson, Tilton, Fallon & Lungmus
ATTORNEYS.

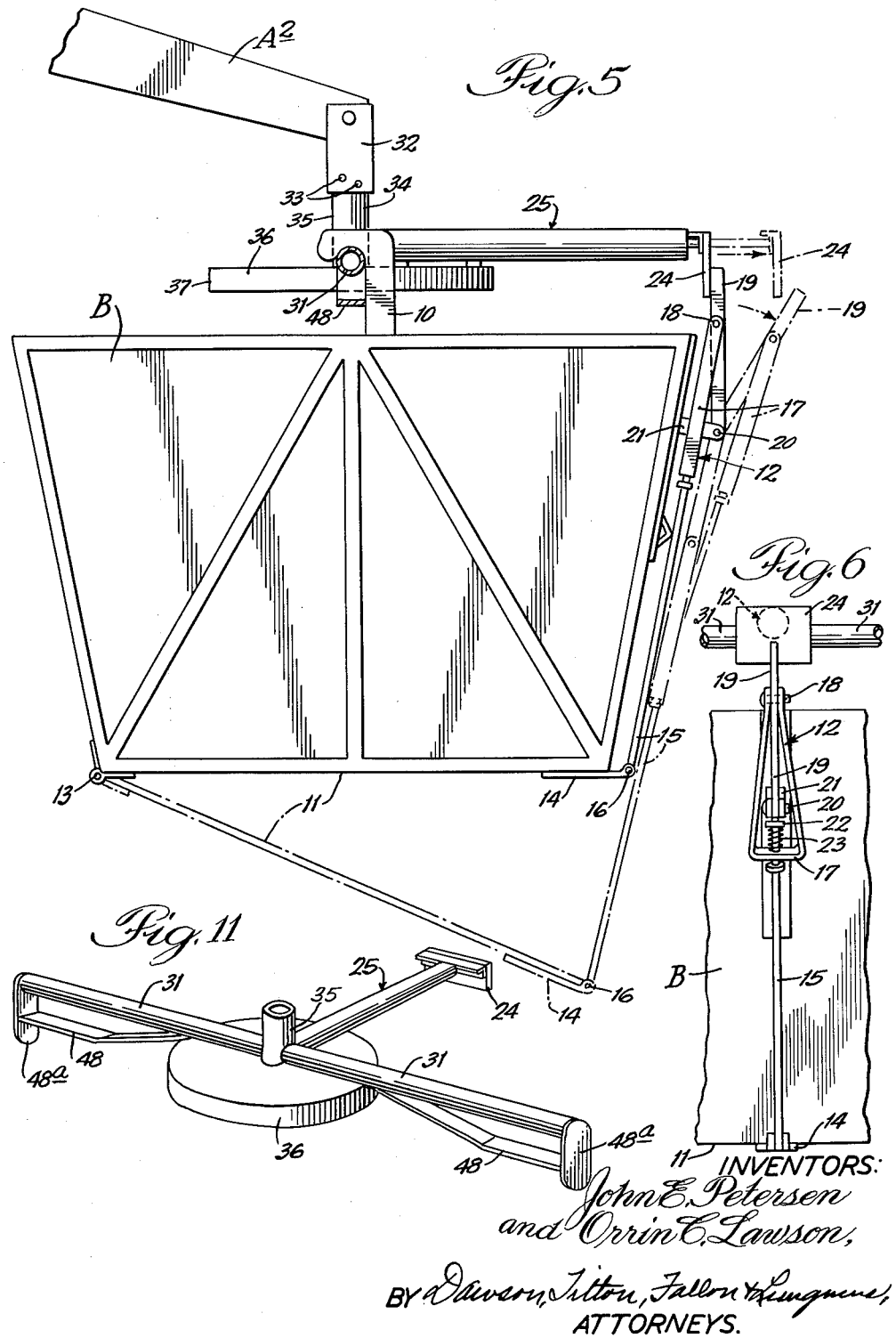

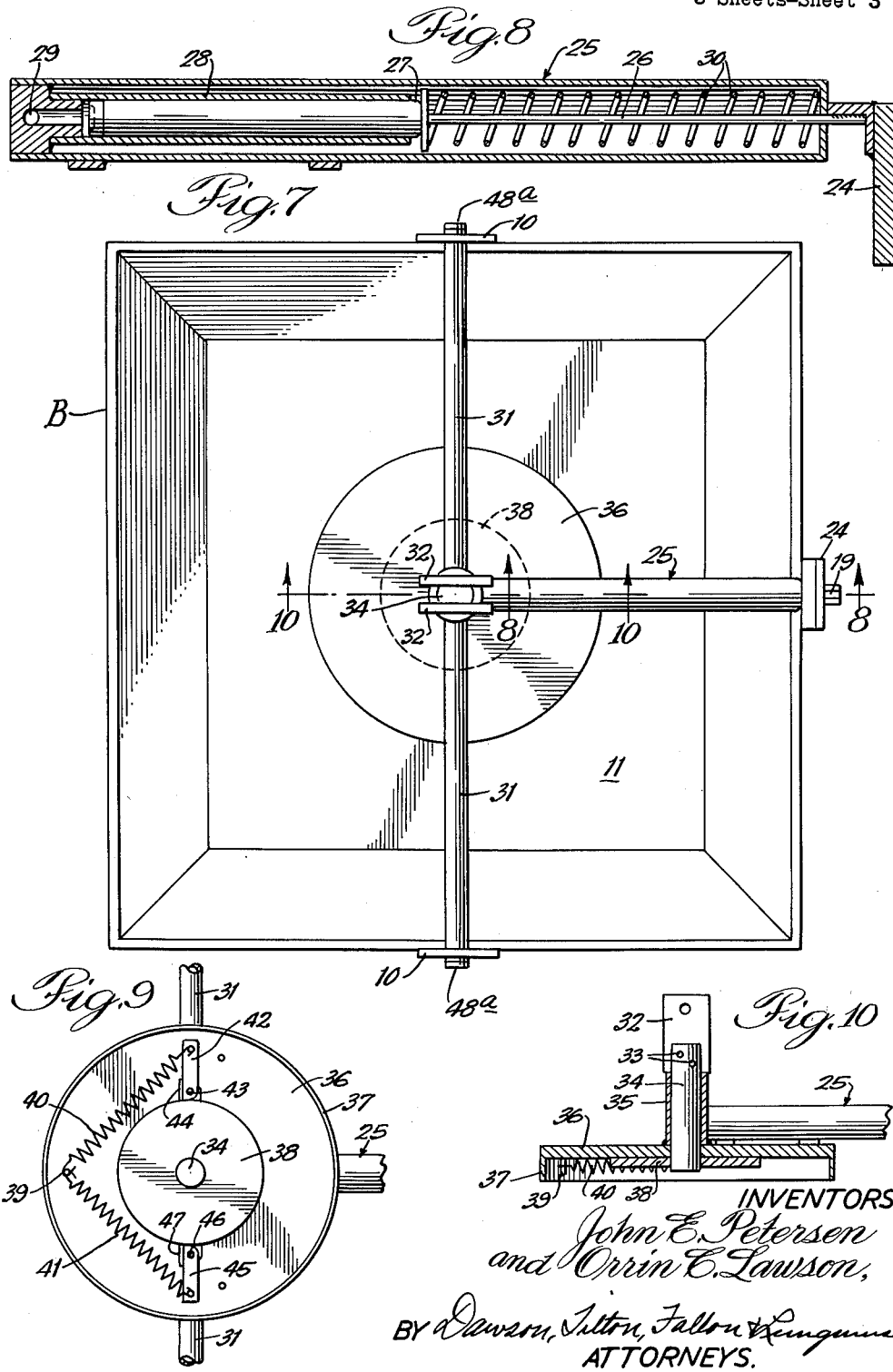

United States Patent Office 2,981,424
Patented Apr. 25, 1961

2,981,424

LOADING APPARATUS

John E. Petersen and Orrin C. Lawson, Lake Wales, Fla., assignors to Petersen Industries, Inc., Lake Wales, Fla., a corporation of Florida Filed Feb. 19, 1960, Ser. No. 9,766

13 Claims. (Cl. 214—77)

This application relates to a loading apparatus. The apparatus is particularly useful in the loading of citrus fruit, potatoes, peaches, apples, vegetables, granular fertilizer, and a variety of other products and materials.

It is common practice to employ trucks equipped with a power boom for lifting containers, such as baskets containing the fruit, and unloading the material into truck containers, etc. A problem has long existed with respect to such use of a power boom. Since the boom is operated at a distance from the basket and since it is difficult to manipulate it accurately at such distances, it is important to find means for connecting the boom effectively with the containers or the hooks or other connections on the containers by means which will enable the boom to be operated in simple movements as, for example, by moving it forwardly in a straight line on a level with the basket. A further problem is involved in restoring the basket into a predetermined alignment with the boom after the basket has been engaged and lifted.

We have discovered that by rotatively mounting a lift bar upon the boom and by providing spring-actuated centering means, it is possible to connect the boom with hooks or other connections with which the basket is provided through the rotative swinging of the lift bar as it engages first one hook and then another, while the spring centering means restores the bar to its desired transverse position across the boom during the lifting operation.

An object of the invention is to provide improved lifting and centering means whereby such means carried by the boom can be caused to readily engage a basket or other container and which, upon the lifting of the basket, causes the basket to be automatically aligned with the boom or moved to a predetermined selected position with respect to the boom. Another object is to provide mechanism and means for the speedy and accurate lifting of fruit, vegetables, and other products and materials and for the emptying of the same with a minimum distance of fall and with a minimum time and labor requirement. A still further object is to provide means actuated by the operator of the boom for unloading the basket when it is over the truck container while at the same time permitting a ready relatching of the basket when it is returned to the ground or other support. Yet another object is to provide a method and means for lifting baskets having latched bottoms from the ground or from flat-topped trucks or other platforms, and, after suspending the baskets over the truck container, tripping the latches of the baskets and emptying them into the truck container, etc.

A still further object is to provide mechanism whereby a lifting boom carried by a truck may be employed through the use of rotatively-supported lift bars for quickly and effectively engaging the side hooks of baskets for elevating the same into dumping position, while at the same time providing means for centering the lift bars or restoring them to their original position transversely of the boom for ready engagement with the hooks or connections of another basket. A further object is to provide latch and trip mechanism which may be operated by the truck operator for releasing hinged bottoms on the baskets while at the same time providing, in conjunction with a lift boom, a lift bar rotatively mounted on the boom and extending transversely thereof, and centering means for restoring the bar to its original transverse position, whereby the latch bar may be advanced into successive engagement with the side hooks of baskets for automatic engagement therewith and irrespective of the positions of the baskets. Other specific objects and advantages will appear as the specification proceeds.

The invention is shown, in an illustrative embodiment, by the accompanying drawings, in which—

Figure 1 is a broken perspective view of a container truck and with boom and lift mechanism and basket structure embodying our invention; Fig. 2, a rear view in elevation of the truck showing the basket in elevated position; Fig. 3, a view similar to Fig. 2 but showing the bottom of the basket in unlatched position for unloading fruit; Fig. 4, a view similar to Fig. 3 but showing the emptied basket restored to its place on the ground and the lift bar in position for engaging another basket; Fig. 5, a broken enlarged side view in elevation of the lifting mechanism and basket structure; Fig. 6, a broken detail end view showing a portion of a basket and the latch mechanism thereof; Fig. 7, a top plan view of the basket and latch-trip mechanism; Fig. 8, a sectional detail view showing the latch-trip mechanism, the section being taken as indicated at line 8—8 of Fig. 7; Fig. 9, a bottom plan view of the lift bar support and the boom connections therewith; Fig. 10, a detail sectional view, the section being taken as indicated at line 10—10 of Fig. 7; and Fig. 11, a perspective view of the lifting and latch-trip mechanism shown disconnected from the boom.

As shown more clearly in Figs. 1–4 inclusive, a truck A carries a container $A^1$ and is equipped with boom parts $A^2$ and $A^3$. Since the truck and boom structures are of well-known construction and are commonly used in the industry, a detailed description of these is believed unnecessary. It is sufficient to say that the truck is equipped with boom parts $A^2$ and $A^3$ and with power mechanism for operating these parts so as to elevate them and swing them from side to side so that the structures may be raised and lowered and moved into position in alignment with the truck container $A^1$ and laterally of the truck. The container $A^1$ of the truck may be a very deep container, as is commonly employed in the handling of grapefruit and oranges, or it may be of less depth for the handling of other kinds of fruit, vegetables, and other materials.

B designates a basket which is provided on opposite sides with hooks 10 and with a hinged bottom 11. Releasable latch mechanism 12 is employed for locking the bottom in closed position, as shown in Fig. 2, and for releasing the bottom to dumping position, as shown in Fig. 3. The basket is shown in greater detail in Figs. 5 and 6. The bottom 11 is hinged to the basket body at 13, and the opposite side of the basket is supported in closed position by the lever 14 which forms a part of the latch 12. The hooks 10 always face in the same direction and in the direction opposite to the basket side carrying the latch mechanism 12.

The latch 12, as shown best in Figs. 5 and 6, comprises a rod 15 connected at its lower end to the lever 14 by a pivot pin 16 which permits a limited movement between parts 14 and 15. A rod 15 extends through a triangular-shaped member 17 which at its upper end is pivotally connected by pivot pin 18 to a trip lever 19. The trip lever 19 is pivotally supported at its lower end upon pivot pin 20, which extends through the member 19 and two spaced brackets 21. The upper end of the lever 19 extends freely above the pivot pin 18 and in a position for engagement with trip release mechanism which will be later described. The upper end of rod 15 is provided with a nut 22, and a compression spring 23 extends between the nut 22 and the lower portion of the member 17. The spring 23 permits some play in the movement of the rod 15 and during the latching and unlatching movement of the mechanism 12.

The upper portion of the pivoted trip lever 19 extends in line with a trip head 24 actuated by a hydraulic cylinder 25.

The hydraulic cylinder 25 is shown in detail in Fig. 8, and it comprises, in addition to the trip head 24, a piston rod 26 connected to a sleeve piston 27 mounted within the hydraulic piston tube 28. The hydraulic fluid is supplied through tube 29 to the rear end of the piston sleeve 27 when it is desired to project the piston rod 26 outwardly. Upon the release of the pressure of the fluid, the spring 30 within casing 25 returns the piston 27 to its original starting position. It will be understood that instead of a single-acting hydraulic piston, as illustrated, a double-acting piston or other power means may be employed for actuating the trip head 24 against the upper end of the trip lever 19. It will be understood that the conduit 29 leading from the hydraulic piston tube or cylinder leads to a pump carried by the truck A and, by means of a valve, pressure fluid may be admitted at will to the cylinder 28 for the actuation of the piston. Since such pump and hydraulic actuating mechanism is well known, a further description herein is believed unnecessary.

We have discovered that by rotatively mounting the lift bar 31 upon the boom $A^2$ and by providing spring-actuating centering means, it is possible to connect the boom to the hooks 10 of the basket B very readily through the rotative swinging of the lift bar 31 as it engages first one hook and then another and by employing spring centering means for restoring the bar 31 to its desired transverse position across the boom $A^2$ during the lifting operation. As shown best in Figs. 4, 7 and 10, the boom $A^2$ is secured to the spaced plates 32 and the plates 32 are secured by bolts 33 to a depending shaft 34. The shaft 34 is housed within a bar sleeve 35 welded to the circular plate 36 having a depending circular flange 37. The lift lever 31 is welded to the plate 36 so as to be rigid therewith, and the plate 36, with the lift lever 31, rotates upon the shaft 34 which is now rigid with the boom $A^2$. The lower end of the shaft is welded to an endplate 38, as shown best in Fig. 10, and there is thus provided bearing surfaces between the upper surface of plate 38 and the lower surface of plate 36 and bearing surfaces between the inner side of sleeve 35 and the outer surface of shaft 34. With this structure, it will be seen that the lift bar 31 and its plate 36 may rotate independently of the shaft 34 carried by the boom $A^2$.

We prefer to provide centering means for the bar 31, which normally extends transversely of the boom $A^2$, so that, when shaft 31 is moved away from its transverse position when it is contacting successively the hooks 10, the cross bar 31 will be again restored to its original transverse position. Such centering or tension means are shown best in Fig. 9. To the underside of plate 36 is secured a pin 39, and springs 40 and 41 extend angularly from the pin. The opposite end of spring 40 is secured to a lever arm 42 pivotally connected by pin 43 to the bottom of plate 38 and a flange 44 carried by the plate 38 abuts one side of the lever 42. Similarly, the end of spring 41 opposite pin 39 is connected to a lever 45 pivotally connected by pin 46 to the bottom of plate 38 and an abutment flange 47 carried by plate 38 engages one end of the lever 45. With this structure, when the lift bar 31 is swung laterally after engaging one of the hooks 10 of basket B, one of the springs 40 or 41 is stretched and the tension spring, after the lifting of the basket, tends to center the lift bar 31 or to restore it to its transverse position relative to the boom $A^2$.

To stabilize the basket B when the same is lifted, we equip the lift bar 31 with a stabilizing strap 48, the end of the bar 31 and the strap 48 being connected by a depending plate 48a. This structure, as shown best in Fig. 5, causes the lower portion of the strap 48 and the bar 31 to engage the vertical portion of the hook 10 at spaced distances and thus prevent rocking of the basket when it is being lifted by the boom.

*Operation*

In the operation of the apparatus, the boom $A^2$ is moved to direct the lift bar 31 toward the basket hooks, being normally moved forward in a straight line on the level of the hooks. In operation, one end of the lift bar strikes one of the hooks 10, and since the lift bar is rotatably mounted on the boom $A^2$, the opposite end of the lift bar swings automatically on shaft 34 as a pivot and into engagement with the opposite hook, thus quickly connecting the lift bar with the two hooks, and upon raising the boom slightly, the basket is firmly supported and may be lifted upon the flat truck or above the container truck. When the basket is raised above the container truck, the operator moves the hydraulic control valve to pass pressure fluid into cylinder 28 and the trip head 24 is moved outwardly, as illustrated in Figs. 2 and 3, for tripping the lever 19. As the upper portion of lever 19 is moved outwardly, it will be seen that the structure 17 is moved over center and the parts 17, 15 and 14 are allowed to swing downwardly to the open position illustrated in dotted lines in Fig. 5 for the discharge of the fruit, etc.

After the basket has been opened and the fruit discharged, as illustrated in Fig. 3, the basket may be swung laterally of the truck and allowed to drop upon the floor of the flat-bedded truck or upon the ground. In this operation, it is found that the force of the fall of the basket, in striking the bottom 11, throws the members 15 and 17 upwardly with substantial force and so that the trip lever 19 swings across center, that is, across the pivot 20, so as to effect an automatic relatching of the bottom 11. When the lift bar 31 is moved away from the empty basket B, as illustrated in Fig. 4, the bar 31 is always in position transverse to the boom $A^2$, being restored to this position by the springs 40 and 41, and thus the lift bar is in a desired position for approaching another basket which has been filled and is ready for elevation.

In all of the foregoing operations, it will be seen that the loading of the baskets, the emptying of the baskets, and the return of the baskets to positions for refilling, are accomplished by a single operator, who may remain in the truck during these operations. The boom $A^2$ is swung toward a basket to bring one end of the lift bar 31 into engagement with one of the basket hooks, and as the boom moves forwardly in a straight line, the bar 31 swivels upon the shaft 34 to engage the other hook and the basket is then lifted to the desired position. When the basket is placed above the container $A^1$ of the truck A, the operator uses pressure fluid to operate the piston 27 and a trip head 24 so that the upper end of lever 19 is engaged and the latch 12 released. After emptying the basket, the basket is returned to the desired position and the lift bars released therefrom, the centering mechanism maintaining the lift bar in its initial position transversely of the boom $A^2$.

The above apparatus may be operated in a variety of ways. For example, the baskets B, after they are filled with the fruit or other material, may be lifted by the boom to an ordinary flat truck which can then be moved readily between the rows of trees and the baskets then lifted by the boom mechanism herein described above the container of a large roadside truck and the baskets emptied, the baskets being then returned to the flat truck for return to the grove. Alternatively, the lifting truck may be driven through the grove lifting the filled baskets on one side of the truck and depositing them on the other side of the truck under the trees not yet picked.

While the invention has been described in connection with fruit, and particularly citrus fruit, it will be understood that the apparatus and method are applicable to other objects and materials, and in the foregoing specification, while we have set forth specific structure and steps in considerable detail for the purpose of illustrating the invention, it will be understood that such details of structure and procedure may be varied widely by those skilled in the art without departing from the spirit of our invention.

We claim:

1. In apparatus for loading material onto a truck, a basket having its sides equipped with hooks facing in the same direction, said basket having a hinged bottom and a latch therefor extending laterally of the basket, power-operated means for moving said latch outwardly to release said hinged bottom, a boom carried by said truck and equipped with a lift bar rotatively mounted thereon, and centering springs engaging said lift bar for normally maintaining it in a transverse position relative to said boom, whereby when said lift bar is advanced into engagement with one of said hooks, said bar may rotate into engagement with the other hook facing the bar while energizing one of said springs and aligning said power-operated means with said latch.

2. The structure of claim 1 in which said latch tripping means for releasing the hinged bottom of the basket is supported by said boom.

3. The structure of claim 2 in which said latch-tripping means consists of a hydraulic cylinder equipped with a piston rod and a trip head.

4. In apparatus for unloading material carried by a basket having its sides equipped with hooks, a lift boom, means for raising and lowering said boom, a lift bar rotatably mounted upon said lift boom and extending transversely thereof, stabilizing straps carried by said lift bar and engageable with said hooks to prevent rocking of said basket as it is lifted, and centering means releasably urging said lift bar into a position transverse of said boom.

5. In apparatus for loading material onto a truck, said material being carried in a container having its sides equipped with hooks having vertical shanks, a lift boom carried by said truck, a lift bar rotatably mounted upon said lift boom and having spaced stabilizing straps engageable with the vertical shanks of said hooks for stabilizing the containers carried by said lift boom, and centering means releasably urging said lift bar into a predetermined position relative to said boom.

6. In apparatus for loading material onto a truck, a basket having its sides equipped with hooks facing in the same direction and having a hinged bottom and a latch therefor equipped with a vertically-extending lever, lifting means carried by said truck and equipped with a disk rotatably mounted on said lift means, a lift bar mounted on said disk, a power cylinder mounted on said disk rotatably mounted on said lifting means, a lift bar trip arm adapted to be moved outwardly to engage said lever for releasing said hinged bottom, means for advancing said lifting means to bring the lift bar into successive engagement with the hooks of said basket and to align said trip arm with said lever, and centering means carried by said lifting means for restoring said lift bar to a predetermined position relative to said lifting means.

7. In apparatus for lifting container means, a lifting device, a lift bar extending transversely of said lifting device and secured thereto by a vertical pivot whereby said lift bar may rotate in a generally horizontal plane, a power-operated trip device secured to said lift bar and extending at right angles thereto, and centering means connected to said lifting device and said lift bar for normally maintaining said lift bar in a position transverse of said lifting device, said centering means yielding to permit said lift bar to rotate for connection with said container means but restoring said lift bar to initial position transversely of said lifting device when said container means is raised.

8. In apparatus for loading articles carried by a truck, a basket having its sides equipped with hooks facing in the same direction, said hooks having straight, vertically-extending shanks, a lift boom carried by said truck, a tubular lift bar rotatably mounted on said lift boom and extending transversely thereof, said lift bar being provided with spaced stabilizing means engaging the shanks of said hooks at a spaced distance from the lift bar to prevent rocking of the basket when the same is lifted, and centering means releasably urging said lift bar into a position transversely of said boom.

9. In combination with a basket filled with material to be unloaded and equipped at its top with hooks facing in the same direction, said basket having a hinged bottom and latch means equipped with a lever extending above and laterally of the top of the basket, a lifting device equipped with a lift bar rotatably mounted thereon and extending transversely of the lifting device, said lift bar being engageable successively with the hooks of said basket, a power-operated cylinder connected to said lift bar and extending at right angles therefrom, a plunger in said cylinder adapted to be projected outwardly for engagement with said lever to release said latch, and centering means carried by said lifting device yielding to permit rotation of said lift bar into engagement successively with the hooks of said basket to bring said plunger into alignment with the lever of said latch but restoring said lift bar to a predetermined position relative to said lifting device when the bottom of the basket is free from a supporting surface.

10. In combination with a container lift device equipped with a fixed depending shaft, a disk rotatably secured to said shaft, tubular lift arms carried by said disk and extending laterally thereof for engagement with a container, lever means confined below said disk and fixed to the end portion of said shaft, and centering springs engaging said lever means below said disk and adapted to be energized thereby, when the lift arms are rotated, to restore said lift arms to a predetermined position relative to said shaft.

11. In loading apparatus, a basket having its sides equipped with hooks facing in the same direction and having a hinged bottom equipped with a latch having a pivotally mounted off-center lever extending vertically along one side of the basket, lifting means carried by said truck and equipped with a lift bar rotatably mounted on said lifting means, means for advancing said lifting means to bring the lift bar into successive engagement with the hooks of said basket, a power-operated trip device mounted for movement outwardly into engagement with said lever for releasing said latch, and centering means carried by said lifting means for restoring said lift bar to a predetermined position relative to said lifting means.

12. In apparatus for lifting container means, a lifting device, a disk rotatably secured on said lifting device, a tubular lift bar secured to said disk and extending transversely of said lifting device for rotation in a generally horizontal plane, means adjacent the ends of said lift bar for connecting said bar to said container means, and centering means connected to said lifting device and said disk for normally maintaining said lift bar in a position transverse of said lifting device, said centering means yielding to permit said lift bar to rotate for connection with said container means but restoring said lift bar to initial position transversely of said lifting device when said container means is raised.

13. In apparatus for lifting container means, a lifting device equipped with a depending shaft, a disk rotatably mounted on said shaft for rotation in a generally horizontal plane, tubular members welded to said disk and extending substantially at right angles to each other, one of said tubular members constituting a lift bar and the other tubular member constituting a power trip device, a container having hooks facing in the same direction adapted to be engaged by said lift bar and having also a hinged bottom equipped with a latch having an off-center lever extending vertically along the side of the container and adapted to be aligned with said trip device when the lift bar engages said hooks, and centering means connected to said lifting device and said disk for normally maintaining said lift bar in a position transverse of said lifting device, said centering means yielding to permit said lift bar to rotate for connection with said container means but restoring said lift bar to said initial position transverse of said lifting device when said container means is raised.

References Cited in the file of this patent
UNITED STATES PATENTS

| | | |
|---|---|---|
| 665,682 | Hetlesaeter | Jan. 8, 1901 |
| 1,501,954 | Lichtenberg | July 22, 1924 |
| 2,501,112 | Webster | Mar. 21, 1950 |
| 2,599,618 | Dempster | June 10, 1952 |
| 2,928,359 | Vogel | Mar. 15, 1960 |

UNITED STATES PATENT OFFICE
CERTIFICATE OF CORRECTION

Patent No. 2,981,424                                                    April 25, 1961

John E. Petersen et al.

It is hereby certified that error appears in the above numbered patent requiring correction and that the said Letters Patent should read as corrected below.

Column 5, line 60, for "lift", first occurrence, read -- lifting --; line 62, for "rotatably mounted on said lifting means, a lift bar" read -- in angular relation thereto and equipped with a --.

Signed and sealed this 8th day of October 1968.

(SEAL)
Attest:

Edward M. Fletcher, Jr.                                                EDWARD J. BRENNER
Attesting Officer                                                       Commissioner of Patents